Patented May 29, 1934

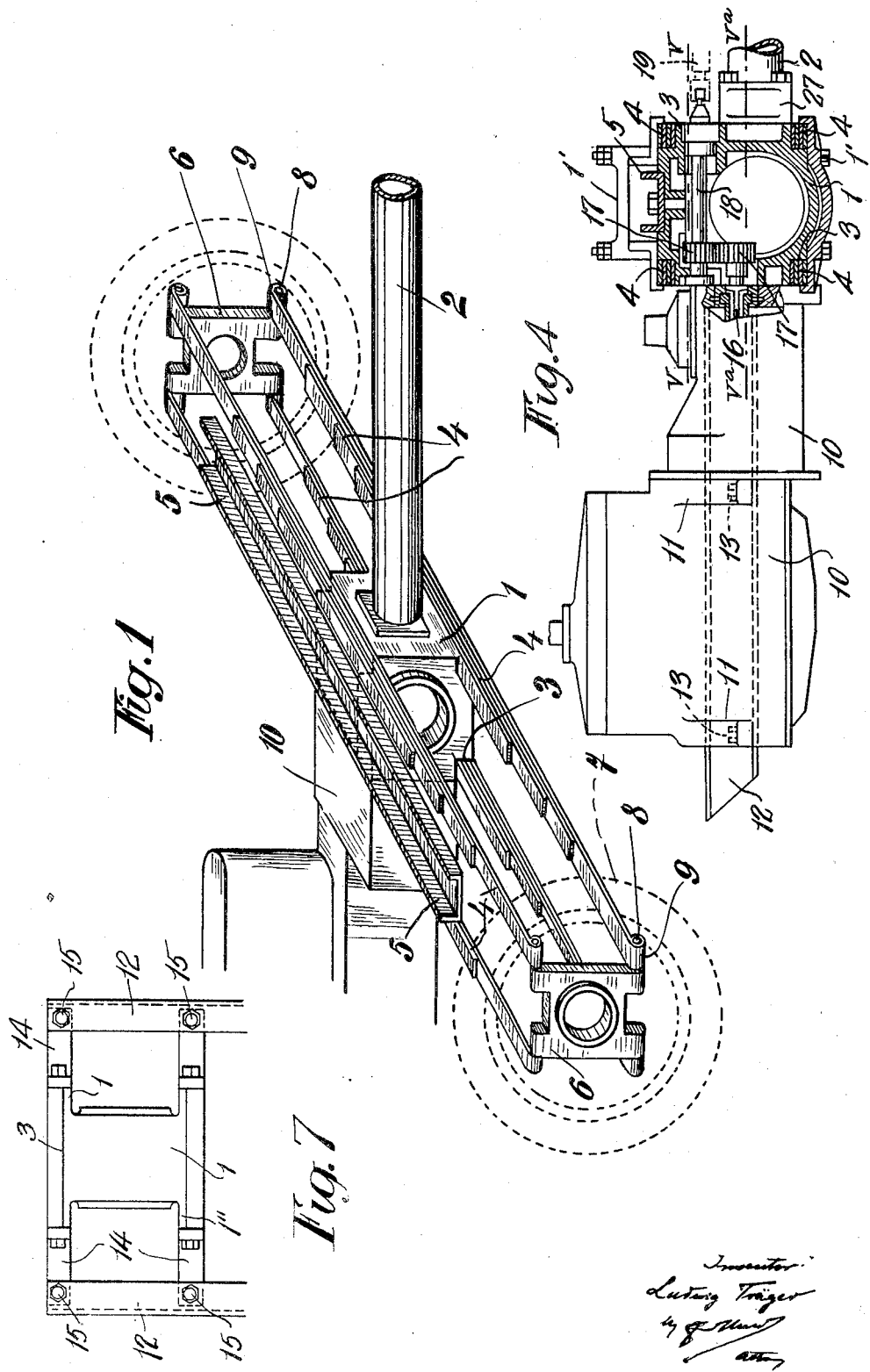

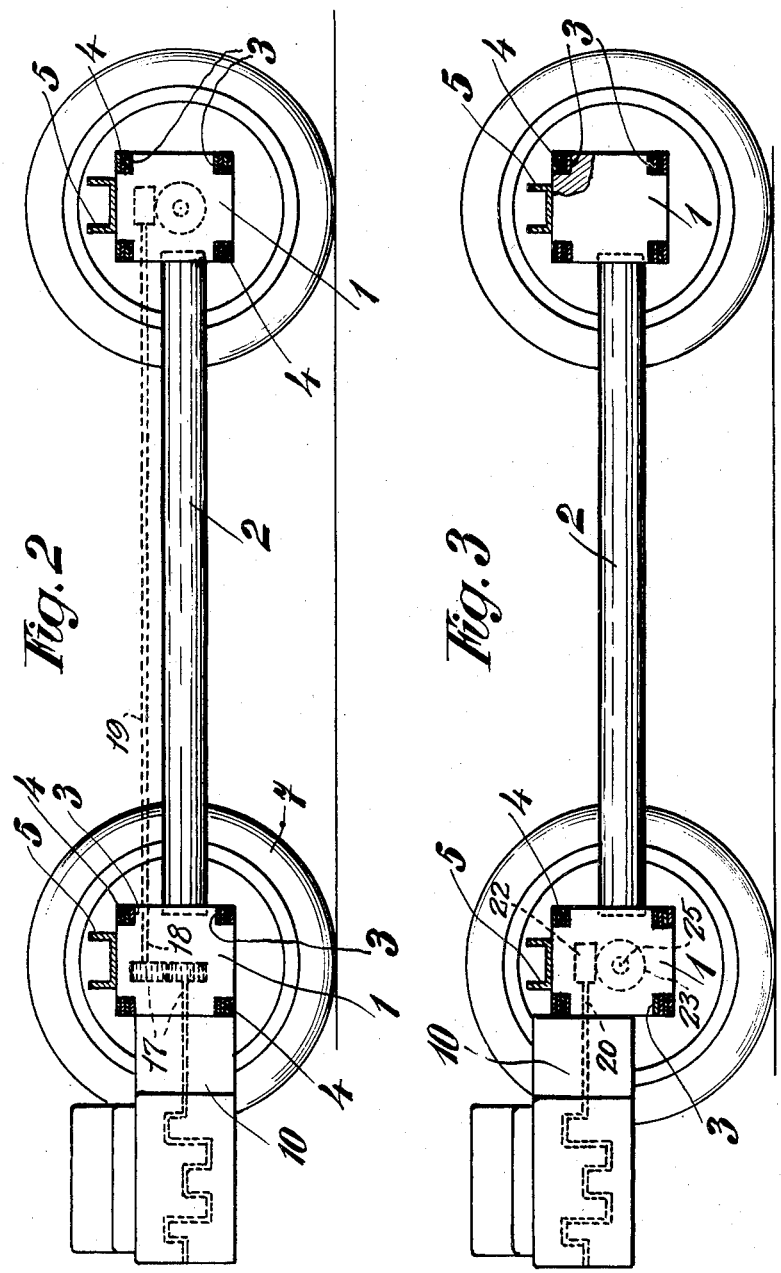

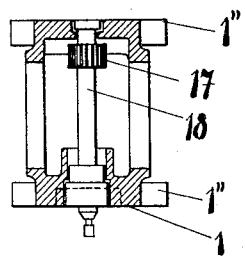
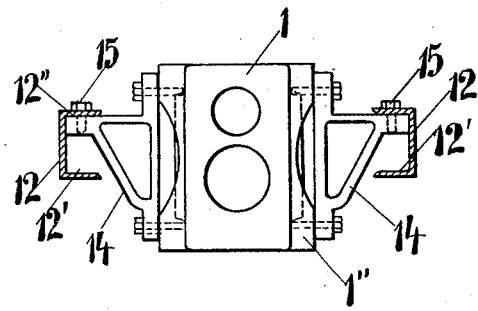
Fig.5  Fig.6
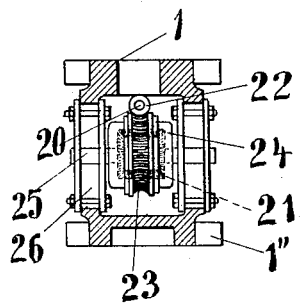
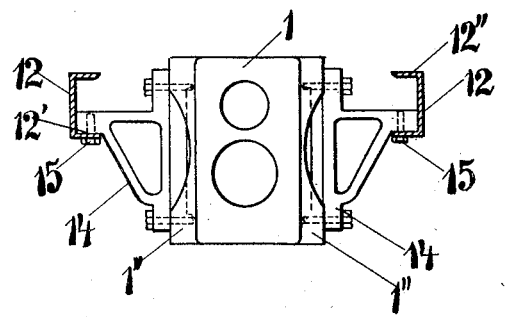
Fig.5a  Fig.6a

1,960,356

UNITED STATES PATENT OFFICE 1,960,356

CHASSIS FOR MOTOR VEHICLES

Ludwig Träger, Vienna, Austria, assignor of one-half to Hanns Netal, Vienna, Austria Application June 1, 1932, Serial No. 614,672
In Austria March 28, 1931

1 Claim. (Cl. 180—49)

This invention relates to a chassis for motor vehicles, in which two hollow supporting blocks united by a connecting tube to form a unit, carry transverse springs on which the wheels of the vehicle are mounted so that they can oscillate freely and independently from one another. The invention consists in that the supporting blocks are constructed absolutely alike and so that they can be interchanged and the driving elements mounted in the supporting block intervening in the driving can be employed both for front wheel and also for rear wheel drive.

An embodiment of the invention is illustrated diagrammatically by way of example in the accompanying drawings in which:—

Fig. 1 is a perspective view of the front portion of the chassis.

Fig. 2 shows the chassis with rear wheel drive.

Fig. 3 shows the chassis with front wheel drive.

Fig. 4 is a side elevation partly in section showing the front supporting block and the block of the engine gear.

Fig. 5 is a section on line V—V of Fig. 4 showing the front supporting block in the case of rear wheel drive.

Fig. 5a is a section on line Va—Va of Fig. 5 showing the front supporting block in the case of front wheel drive.

Fig. 6 shows in front elevation the front supporting block with supporting girders for the gear block in the case of rear wheel drive.

Fig. 6a shows in front elevation the front supporting block with supporting girders for the gear block in the case of front wheel drive.

Fig. 7 is a top plan view of Fig. 6.

The chassis consists of two prismatic hollow supporting blocks 1, preferably made of cast steel, of absolutely uniform shape and interconnected by a steel tube 2 of large diameter. The two supporting blocks 1 have in their four upper and lower transverse edges rectangular recesses 3 for accommodating springs 4. These springs are secured on the supporting blocks 1 by bridges 1' (Fig. 4). Further, on the upper side of the supporting blocks 1 transverse girders 5 are bolted which serve for supporting the body of the vehicle. Hub supports 6 for the vehicle wheel 7 are mounted on the ends of the springs lying in the corners of a rectangle so that bolts 8 of the supports 6 extend through the ends of springs rolled to form sleeves 9. This spring suspension is known, in which both the front and rear axles of the chassis are omitted and in which during the springing of the wheels the individual wheels can oscillate independently of each other and can consequently adapt themselves in a perfect manner to any track whilst the oscillating masses are of very light weight. By the arrangement of four springs 4 on the supporting blocks the correct position of the wheels and avoidance of danger in the case of spring fracture are ensured.

The block 10 accommodating the transmission gear of the engine bears against the front side of the front supporting block 1 and is secured by bolts 13 to two lateral U-girders 12 by means of the engine flanges 11 (Fig. 4). On the laterally projecting ends 1'' (Fig. 5) of the front supporting block 1 brackets 14 (Figs. 6 and 7) are bolted to which the U-girders 12 are detachably connected by bolts 15. In the case of rear wheel drive the upper flanges 12'' of the U-girders bear against the upper side of the supporting brackets 14''. In the case of rear wheel drive (Fig. 2) the transmission shaft 16 is connected by a pair of toothed wheels 17 mounted in this instance in the front supporting block (Figs. 4 and 5) to a shaft stub 18 journalled in the supporting block in a higher plane and connected to the connecting shaft 19 for the worm shaft 20 of the worm and differential gear 21 accommodated in the rear supporting block (Fig. 5a). In the case of front drive (Fig. 3) the worm and differential gear is arranged in the front supporting block and the engine transmission gear block 10 raised so far, that the transmission shaft 16 and the worm shaft 20 are coaxial. In this position the lower flanges 12' of the U-girders 12 bear against the under side of the supporting brackets 14, as shown in Fig. 6a, and are rigidly connected therewith by bolts 15. The transmission shaft 16 is coupled with the worm shaft 20 by a sleeve not shown in the drawings. A worm wheel 23 driven by the worm 22 is mounted on the case 24 of the differential gear 21, the shaft halves 25 of which project through apertures 26 in the supporting block and are coupled with the front wheel axles by means of sleeves or the like. The two kinds of drive are consequently possible by merely changing the vertical position of the engine transmission gear block and by displacing the worm and differential gear from one supporting block to the other.

The body rests on the transverse girders 5 and consequently the entire weight thereof is supported by the two supporting blocks 1. The connecting tube 2 extends through neither of the supporting blocks 1 and is secured by flanges 27 mounted on its two ends. In the case of rear wheel drive the power transmission or connecting shaft 19 is not inserted in the connecting tube 2 but lies exposed as clearly shown in Fig. 2. Besides the uniform construction of the supporting blocks, the wheel hubs, wheel hub supports 6 and springs 4 and the body supports are standardized, and all power transmission elements are alike for the front and rear wheel drive.

I claim:

A chassis for motor vehicles, comprising in combination two hollow supporting blocks of absolutely uniform construction, a central tube interchangeably connecting said blocks, said blocks adapted to accommodate driving elements for front wheel drive or rear wheel drive, an engine transmission gear block detachably connected with the front supporting block, and means for changing the height position of said engine transmission gear block according to the kind of drive.

LUDWIG TRÄGER.